(12) United States Patent
Hong

(10) Patent No.: US 6,349,131 B1
(45) Date of Patent: Feb. 19, 2002

(54) APPARATUS AND METHOD FOR GRAPHICALLY OUTPUTTING STATUS OF TRUNK IN SWITCHING SYSTEM

(75) Inventor: In-Sook Hong, Paju-shi (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/347,400

(22) Filed: Jul. 6, 1999

(30) Foreign Application Priority Data

Jul. 7, 1998 (KR) .............................................. 98-27243

(51) Int. Cl.[7] .............................. H04M 1/24; H04M 7/00
(52) U.S. Cl. ................... 379/29.1; 379/32.02; 379/246; 379/221.06
(58) Field of Search ................................. 379/315, 242, 379/245, 246, 247, 221.03, 221.04, 221.05, 221.06, 9.01, 22, 22.03, 29.07, 29.08, 29.09, 29.1, 32.01, 32.02, 112.06; 709/223, 224; 345/700, 736

(56) References Cited

U.S. PATENT DOCUMENTS

| | | | |
|---|---|---|---|
| 4,734,933 A | 3/1988 | Barsellott et al. ............ 379/164 |
| 5,241,579 A | * 8/1993 | Kim et al. ................ 379/27.01 |
| 5,392,395 A | 2/1995 | Fujii et al. ................... 345/536 |
| 5,437,009 A | 7/1995 | Lane ............................ 345/636 |
| 5,465,286 A | 11/1995 | Clare et al. ............... 379/32.04 |
| 5,504,921 A | 4/1996 | Dev et al. .................... 709/223 |
| 5,513,257 A | * 4/1996 | Yoo et al. ................... 370/244 |
| 5,559,955 A | 9/1996 | Dev et al. ....................... 714/4 |
| 5,606,664 A | 2/1997 | Brown et al. ............... 709/224 |
| 5,751,965 A | 5/1998 | Mayo et al. ................. 709/224 |
| 5,907,670 A | * 5/1999 | Lee .............................. 379/12 |
| 5,909,217 A | 6/1999 | Bereiter ...................... 345/854 |

* cited by examiner

Primary Examiner—Ahmad Matar
Assistant Examiner—Benny Q. Tieu
(74) Attorney, Agent, or Firm—Robert E. Bushnell, Esq.

(57) ABSTRACT

In an apparatus and method for graphically outputting the status of a trunk in a switching system, if a trunk status graphics mode is selected, trunk installation information is received and displayed on a main window. If a specific trunk is selected among the displayed trunk installation information, status information and busy information of the selected trunk are received and displayed on a corresponding subwindow. If there are trunk status information and busy information generated on line from the selected trunk, the on-line generated trunk status information and trunk busy information are automatically received, updated and displayed on the corresponding subwindow. If there is a statistical data request signal, trunk status statistical data is received and displayed on a corresponding window.

21 Claims, 9 Drawing Sheets

APPARATUS AND METHOD FOR GRAPHICALLY OUTPUTTING STATUS OF TRUNK IN SWITCHING SYSTEM

CLAIM OF PRIORITY

This application makes reference to, incorporates the same herein, and claims all benefits accruing under 35 U.S.C. §§119 and 120 from an application entitled Method For Graphically Outputting Status of Trunk in Switching System earlier filed in the Korean Industrial Property Office on Jul. 7, 1998, and there duly assigned Serial No. 98-27243.

BACKGROUND OF THE INVENTION

1. Technical Field

The present invention relates to a switching system and, more particularly, to an apparatus and method for graphically outputting the status of a trunk in a switching system.

2. Related Art

In a conventional switching system, the status of a trunk has been output in text form. That is, a personal computer (PC) for managing the trunk has searched for a subsystem installed in the switching system by commands, and has output the status of a corresponding trunk in text form. The status of the trunk can take about 30 forms such as busy, idle, MMC block, fault block, access fail, and the like. If the status of the trunk is changed, a speech path management block is informed of the changed information. The speech path management block then updates the trunk information. Trunk busy information is updated in a library of a call related block. If an operator requests output of the status of the trunk by MMC commands, the speech path management block retrieves trunk status information and trunk busy information from the library.

However, in such a method for outputting the status of the trunk in text form, it is not easy for an operator to know the status of the trunk because it varies with time and because the speech path management block outputs corresponding information only when the operator inputs commands. Furthermore, when data over 4K per subsystem is output in text form, it may be difficult to detect the occurrence of an error in the trunk and the output of the data may delayed. For example, assuming that the maximum amount of data for a trunk installed in one subsystem is 4K, the amount of on-line transmission data will be 20K if there are just 5 subsystems. Consequently, the load on the switching system and the number of nodes increase due to excessive data transmission.

The conventional method for outputting the status of the trunk in text form does not always include status information as to all trunks. Therefore, in some cases, there is no status information on the trunk per link.

The following patents are considered to be representative of the prior art, but are burdened by the disadvantages discussed herein:

U.S. Pat. No. 5,909,217 for Large Scale System Status Map issued to Bereiter; U.S. Pat. No. 5,751,965 for Network Connection Status Monitor and Display issued to Mayo et al.; U.S. Pat. No. 5,606,664 for Apparatus and Method for Automatically Determining the Topology of a Local Area Network issued to Brown et al.; U.S. Pat. No. 5,559,955 for Method and Apparatus for Monitoring the Status of Non-Pollable Device in a Computer Network issued to Dev et al.; U.S. Pat. No. 5,504,921 for Network Management System Using Model-Based Intelligence issued to Dev et al.; U.S. Pat. No. 5,465,286 for Apparatus for Supervising an Automatic Call Distribution Telephone System issued to Clare et al.; U.S. Pat. No. 5,437,009 for Method and System for Displaying Status Information of Communications Networks issued to Lane; U.S. Pat. No. 5,392,395 for Image Editing System for Transmission Network Supervision issued to Fujii et al.; and U.S. Pat. No. 4,734,933 for Telephone Line Status Circuit issued to Barsellott et al.

SUMMARY OF THE INVENTION

It is, therefore, an object of the present invention to provide an apparatus and method for graphically outputting the status of a trunk in a switching system.

According to an aspect of the present invention, an apparatus and method for graphically outputting the status of a trunk in a switching system provide a PC, a graphics data management block, a traffic resource management block, a status management block, and a trunk control block, and include the function or steps of: receiving trunk installation information from the graphics data management block in response to selection of a trunk status graphics mode, and displaying the received trunk installation information on a main window; if a specific trunk is selected from among the displayed trunk installation information, receiving the status information and busy information of the selected trunk from the graphics data management block, and displaying the received status information and busy information on a corresponding subwindow; if there are trunk status information and busy information generated on line from the selected trunk, automatically receiving the on-line trunk status information and the on-line busy information from the graphics data management block, and updating and displaying the on-line trunk status information and the on-line busy information on the corresponding subwindow; and receiving trunk status statistical data from the graphics data management block in response to a statistical data request signal, and displaying the received statistical data on a corresponding window.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known constructions or functions are not described in detail so as not to obscure the present invention.

Figure 1:
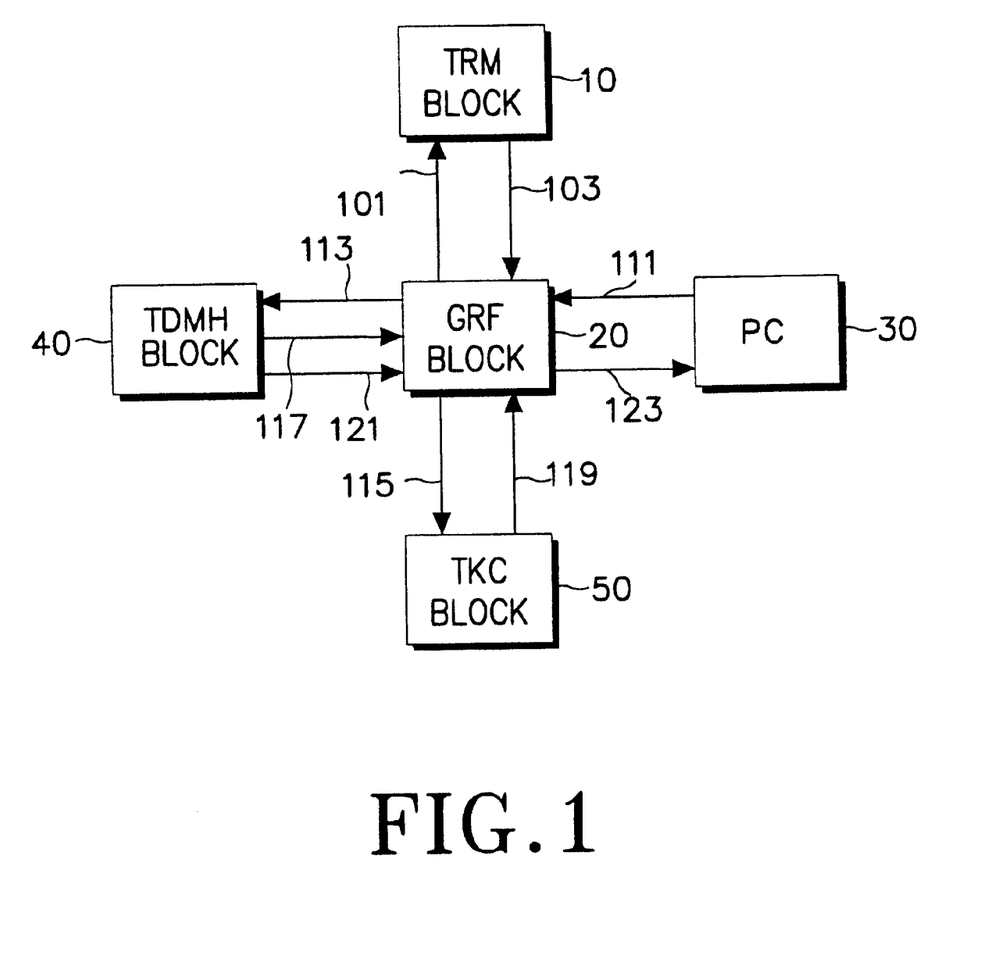
FIG. 1 is a block diagram of an apparatus for graphically outputting the status of a trunk.

FIG. 1 is a block diagram of an apparatus for graphically outputting the status of a trunk in a switching system. A TRM (Traffic and Resource Management) block 10, which is a software block installed in an OMP (Operation and Maintenance Processor), has information about all shapes of the switching system, and provides a GRF (Graphics Data Retrieve and Forward) block 20 with information for displaying trunk graphics.

The GRF block 20, which is another software block installed in the OMP, collects and processes information about a change in the status of the trunk. Upon reception of various information request signals from a PC 30, the GRF block 20 sends corresponding information to the PC 30 according to a PC format.

The PC 30, which is an operator PC for managing the status of the trunk, provides windows for graphically outputting the status of the trunk. If an operator requests output of the status of the trunk, the PC 30 receives corresponding PC information from the GRF block 20 and outputs the received information in the windows of PC 30. For this purpose, the PC 30 includes a switching system interface program and a trunk graphics file.

A TDMH (Telephony Device Maintenance Handling) block 40, which is installed in an ASS (Access Switching Subsystem), senses errors of various devices, and takes charge of maintenance and processing of the status of the switching system.

A TKC (Trunk Control) block 50, which is installed in the ASS, takes charge of a transit call, determines whether each equipment of the switching system is usable, and informs the GRF block 20 of the determined results.

In FIG. 1, reference numerals 101, 103, 111, 113, 115, 117, 119, 121 and 123 denote signal or information flow between the respective blocks.

The signal or information flow between the GRF block 20 and other blocks upon initialization and update of trunk information is as follows:

1. Trunk installation information between the GRF block 20 and the TRM block 10. A reference numeral 101 designates a trunk installation information request signal and reference numeral 103 designates trunk installation information.

2. Initial trunk status information between the GRF block 20 and the TDMH block 40. A reference numeral 113 designates an initial trunk status information request signal and numeral 117 designates initial trunk status information.

3. On-line trunk status information between the GRF block 20 and the TDMH block 40. A reference numeral 121 designates on-line trunk status information.

4. On-line trunk busy information between the GRF block 20 and the TKC block 50. A reference numeral 115 designates a trunk busy information request signal, and reference numeral 119 designates trunk busy information.

Thus, the GRF block 20 collects trunk information from other blocks by means of an information request signal 111 from the PC 30. The collected information is sent to the PC 30 to display the received information on windows of the PC 30.

Figure 2A:
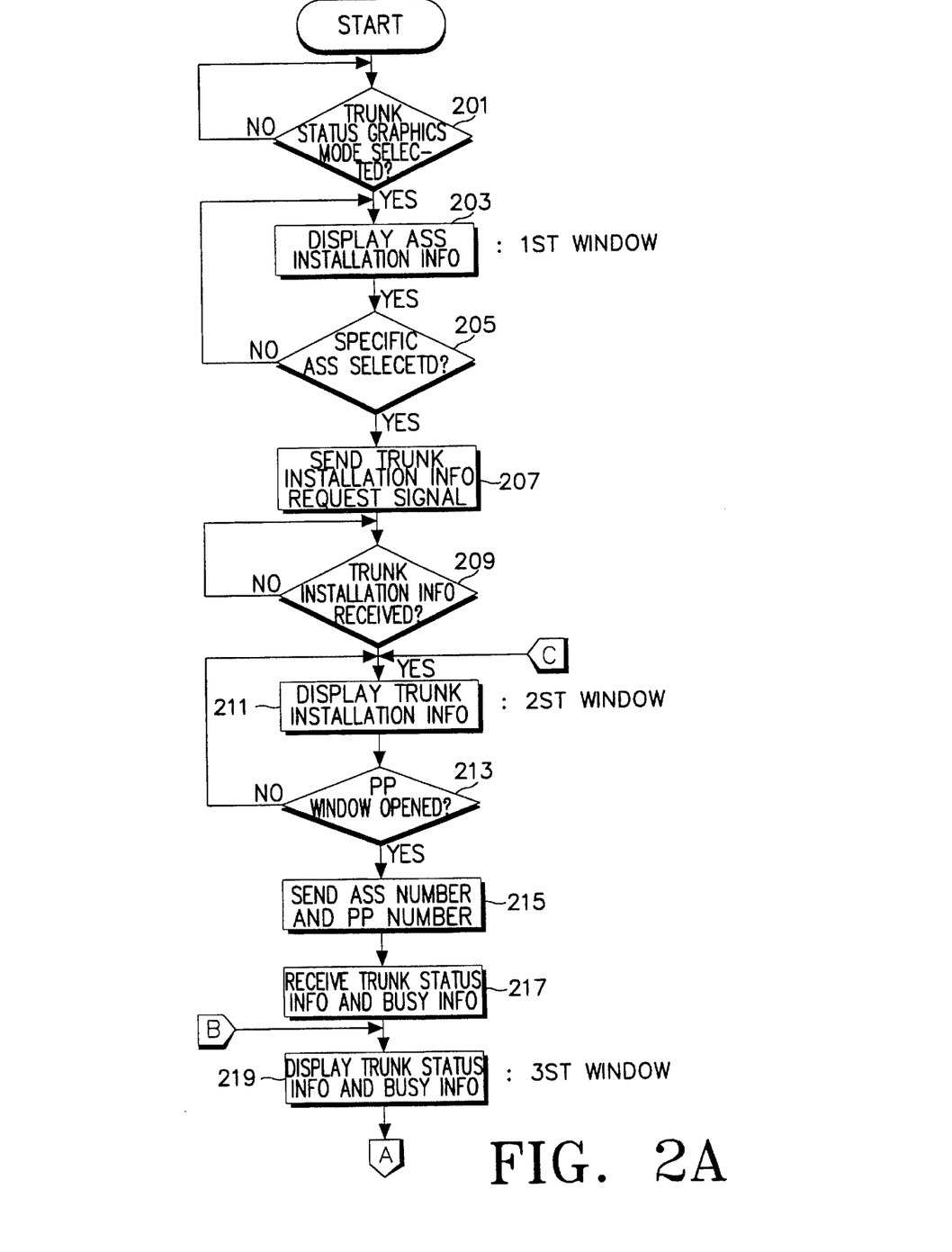
FIGS. 2A and 2B are flow charts illustrating a control procedure executed by a PC for graphically outputting the status of a trunk according to the present invention.
Figure 2B:
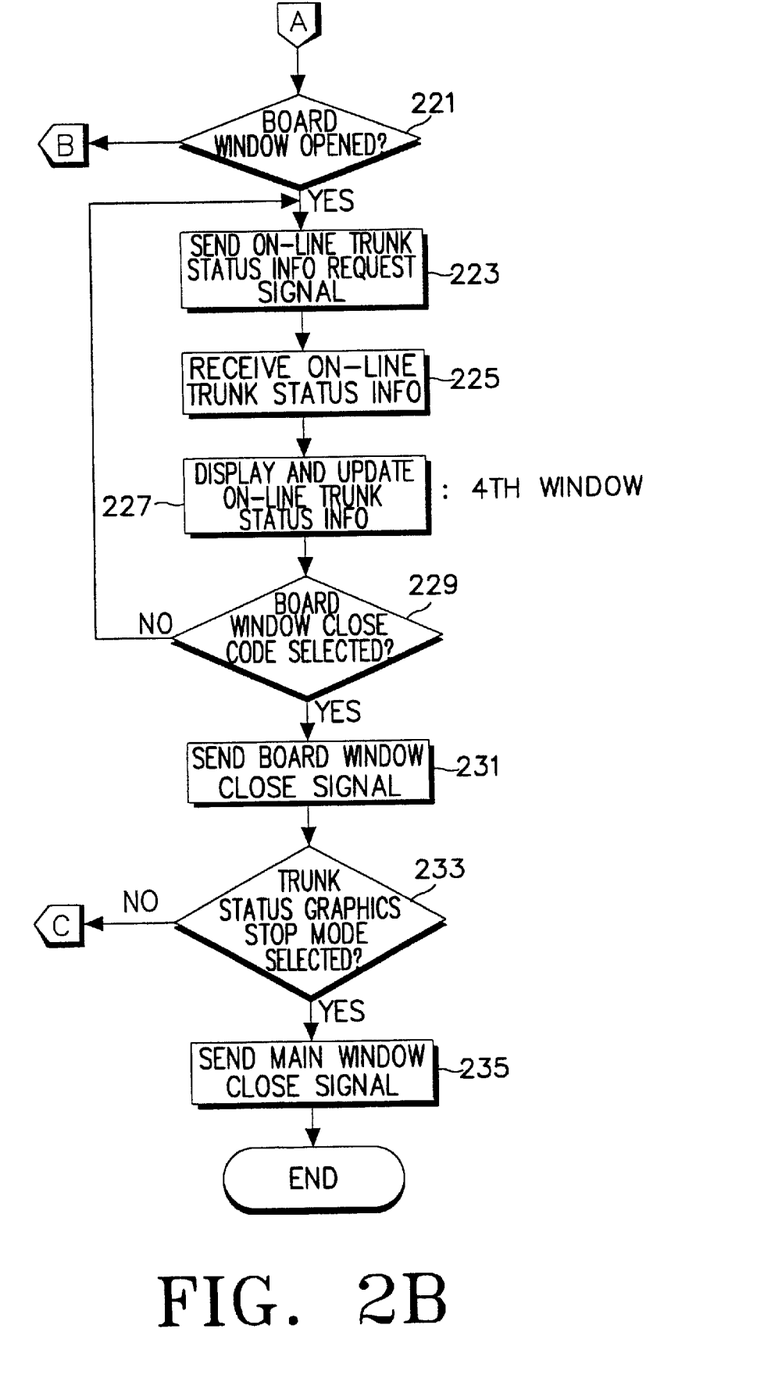

FIGS. 2A and 2B are flow charts illustrating a control procedure executed by the PC for graphically outputting the status of the trunk.

Figure 3:
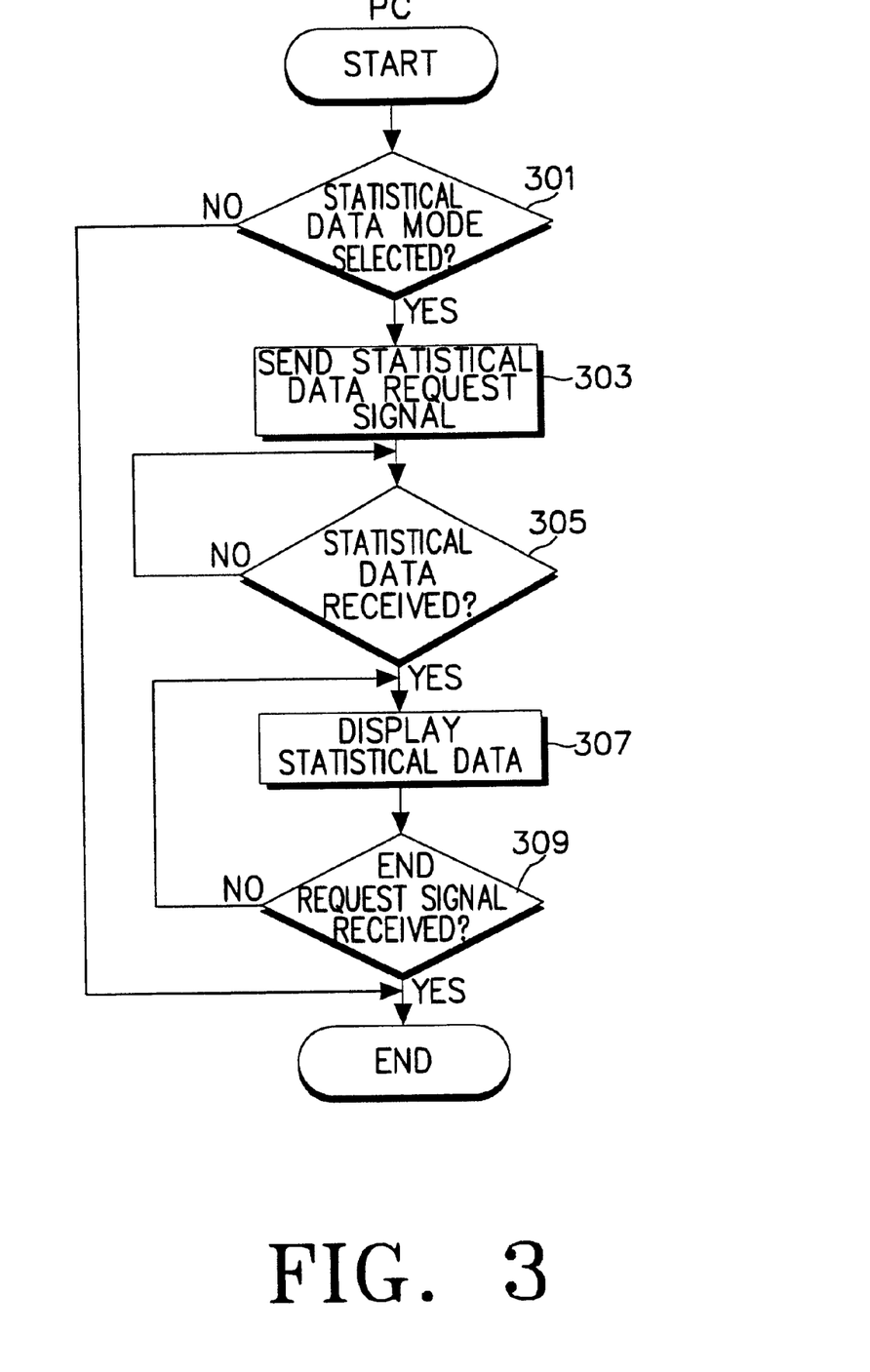
FIG. 3 is a flow chart illustrating a control procedure executed by the PC for graphically outputting statistical data corresponding to trunk status information according to the present invention.

FIG. 3 is a flow chart illustrating a control procedure executed by the PC for graphically outputting statistical data corresponding to trunk status information.

Figure 4:
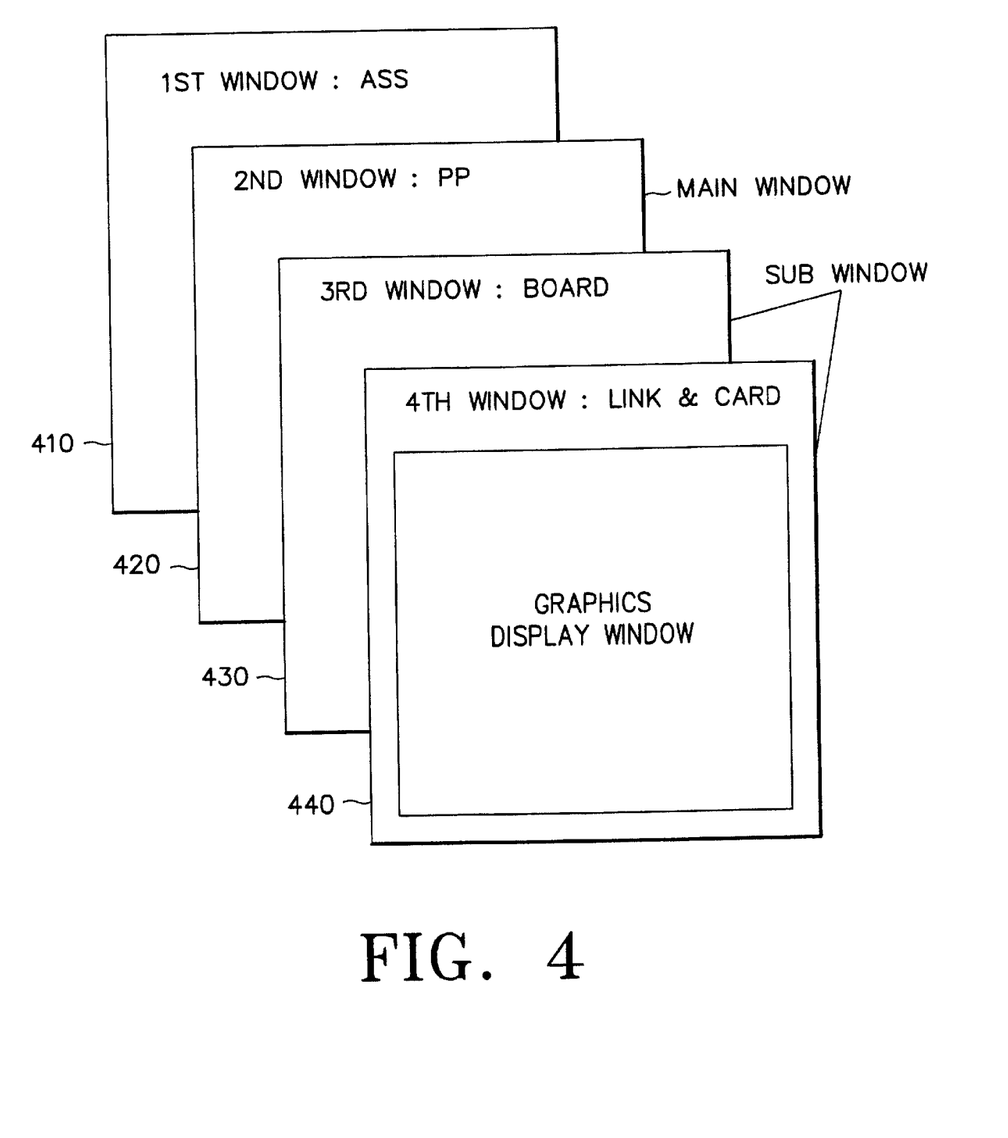
FIG. 4 is a diagram illustrating a window open order according to the present invention.

FIG. 4 is a diagram illustrating a window open order. Windows are opened in order of a first window (ASS window), a second window (PP window), a third window (board window), and a fourth window (link & card window).

Figure 5:
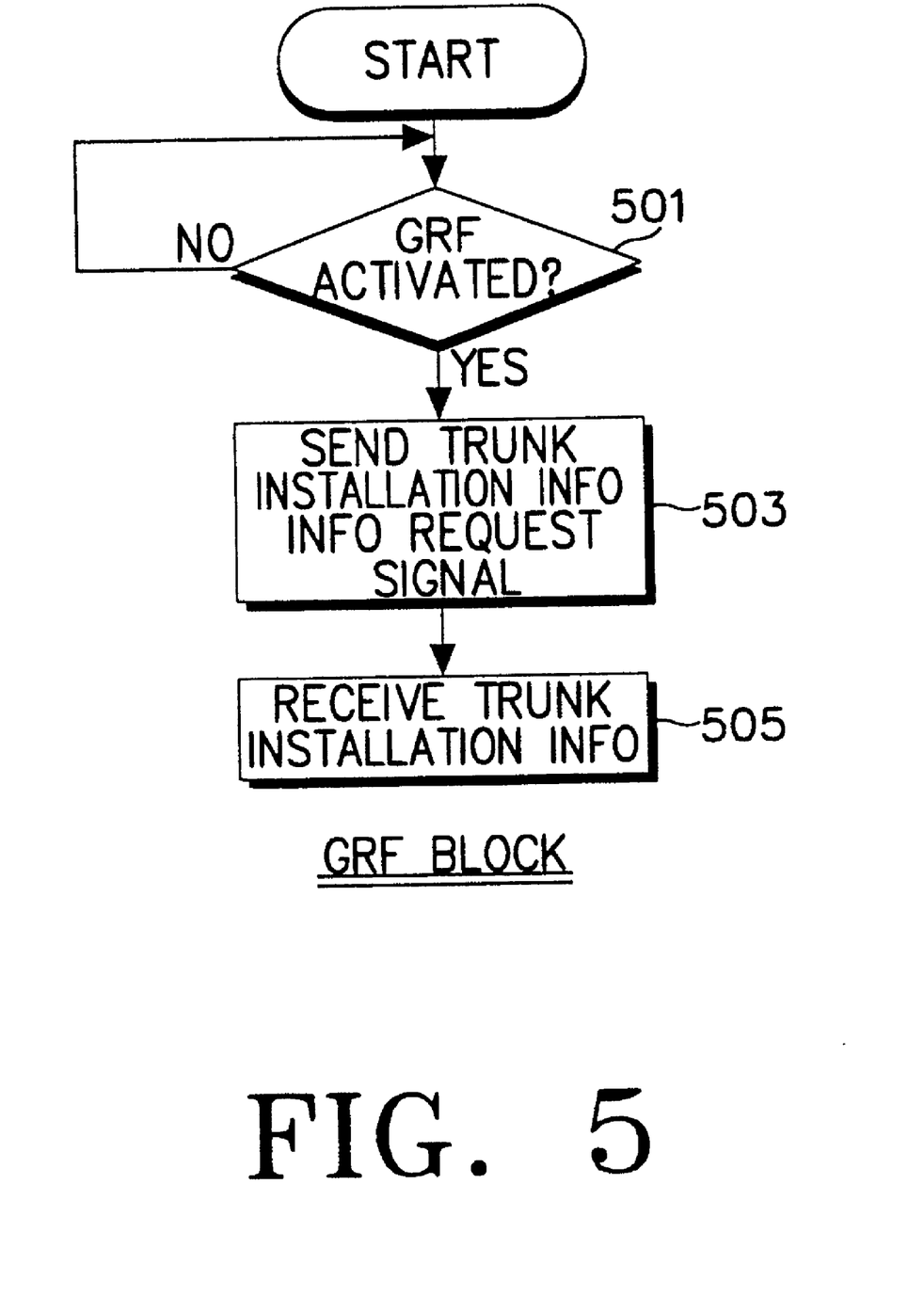
FIG. 5 is a flow chart illustrating an operation upon activation of a GRF block according to the present invention.

FIG. 5 is a flow chart illustrating an operation upon activation of the GRF block. If the GRF block 20 is activated, it receives current trunk installation information from the TRM block 10.

Figure 6:
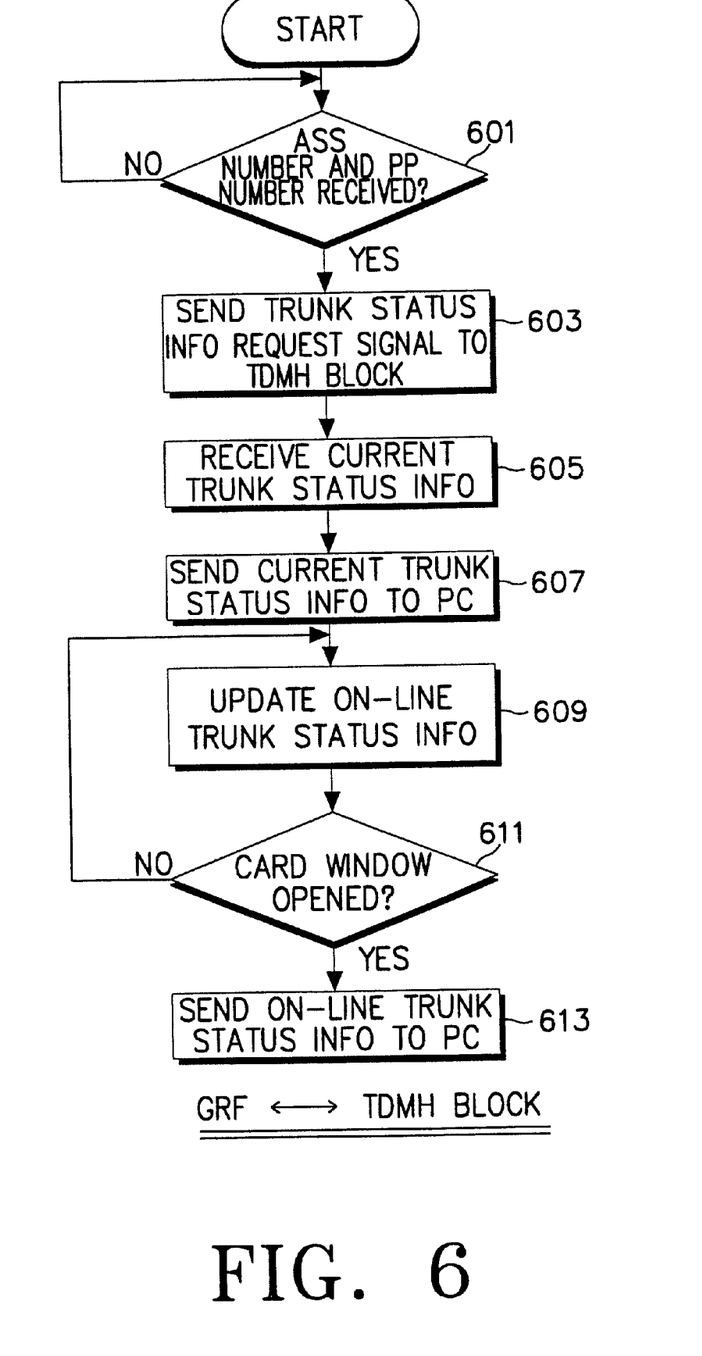
FIG. 6 is a flow chart illustrating a control procedure executed by the GRF block for outputting trunk status information according to the present invention.

FIG. 6 is a flow chart illustrating a control procedure executed by the GRF block for outputting trunk status information. The GRF block 20 receives initial trunk status information and on-line trunk status information from the TDMH 40.

Figure 7:
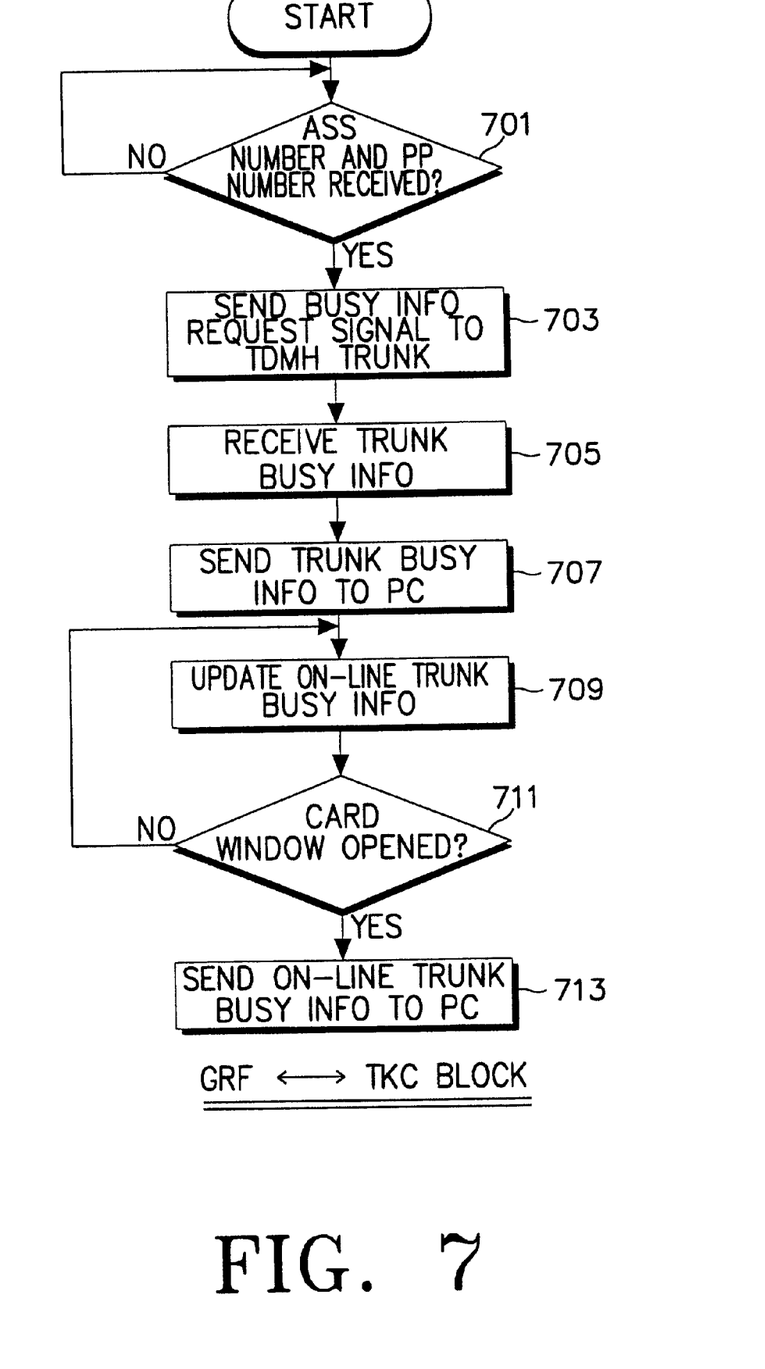
FIG. 7 is a flow chart illustrating a control procedure executed by the GRF block for outputting trunk busy information according to the present invention.

FIG. 7 is a flow chart illustrating a control procedure executed by the GRF block for outputting trunk busy information. The GRF block 20 receives initial trunk busy information and on-line trunk busy information from the TKC 50.

Figure 8:
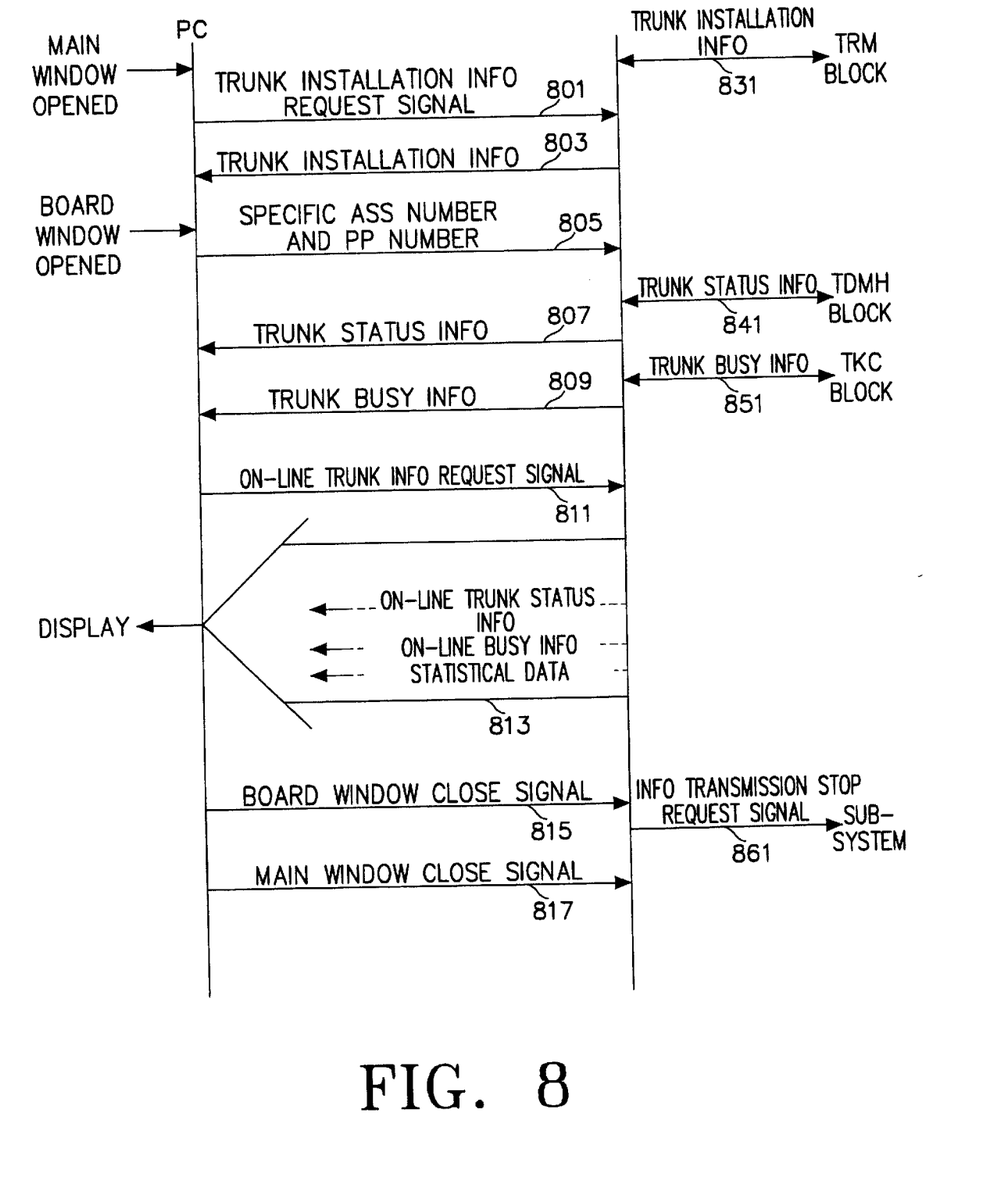
FIG. 8 is a diagram illustrating signal flows between blocks according to the present invention.

FIG. 8 is a diagram illustrating signal flow between blocks.

A preferred embodiment of the present invention will now be described in detail with reference to FIGS. 1 to 8.

Referring to FIG. 2A, the PC 30 determines whether a PC operator has selected a trunk status graphics mode at step 201. If it is selected, ASS installation information is displayed at step 203 on a first window (i.e., ASS window) 410 of the PC 30 shown in FIG. 4. The ASS installation information indicates whether 32 ASSes ASS00–ASS31 are installed or not. If it is determined that the PC operator selects a specific ASS to request display of the status of the trunk at step 205, the PC 30 sends a trunk installation information request signal to the GRF block 20 at step 207. The GRF block 20 then sends to the PC 30 trunk installation information which has been received upon activation, for example, installation information on the ASS and installation information on a PP (Peripheral Processor or lower layer processor). Upon reception of the trunk installation information from the GRF block 20 at step 209, the PC 30 displays, at step 211, the trunk installation information on a second window (i.e., PP window) 420 shown in FIG. 4. The PP window 420 is called a main window.

The GRF block 20 should include the trunk installation information prior to sending it to the PC 30. This procedure is illustrated in FIG. 5. That is, if the GRF block 20 is activated at step 501, it sends a trunk installation information request signal to the TRM block 10 at step 503 and receives the trunk installation information from the TRM block 10 at step 505. Therefore, if the GRF block 20 is requested to send the trunk installation information, the GRF block 20 sends to the PC 30 the previously received trunk installation information.

Turning back to FIG. 2A, if the trunk installation information is displayed at step 211, the operator clicks the installation information for a desired trunk. If it is determined that the PP window 420 is opened at step 213, the PC 30 sends to the GRF block 20 a corresponding ASS number and PP number at step 215. Then, the GRF block 20 collects trunk status information and busy information from corresponding blocks through the operations of FIGS. 6 and 7 which will be described later on. The PC 30 receives from the GRF block 20 the trunk status information and busy information corresponding to the ASS number and PP number at step 217. At step 214, the PC 30 displays the trunk status information and busy information on a third window (i.e., board window) 430 of FIG. 4.

Referring to FIG. 2B, if it is determined at step 221 that the board window 430 is opened, the PC 30 sends an on-line trunk status information request signal to the GRF block 20 at step 223. The on-line trunk status information represents the trunk status information which is changed in real time. The PC 30 receives the on-line trunk state information in card units from the GRF block 20 at step 225. The PC 30 displays the on-line trunk status information on a fourth window (i.e., link & card window) 440 of FIG. 4 and updates the received trunk on-line information at step 227 of FIG. 2B. This updating process continues until trunk on-line information end is selected.

If it is determined that the operator has selected a board window close mode at step 229, the PC 30 closes the board window 430 (FIG. 4) and sends a board window close signal to the GRF block 20 at step 231. The board window close signal indicates a request to stop sending the on-line trunk status information. Then, the trunk installation information is displayed on the window of the PC 30. If a new window is opened, the previous trunk related information is deleted and newly selected trunk information is displayed.

If it is determined that the operator has selected a trunk status graphics stop mode at step 233, the PC 30 sends a main window close signal to the GRF block 20 at step 235 to stop displaying the status of the trunk. The GRF block 20 also terminates a trunk related process.

FIG. 3 illustrates a control procedure executed by the PC 30 for graphically outputting statistical data divided by the trunk status information. If it is determined at step 301 that the operator has selected a statistical data mode, the PC 30 sends a statistical data request signal to the GRF block 20 at step 303. The GRF block 20 sends statistical data divided by the trunk status information to the PC 30 according to a PC format. If it is determined at step 305 that the statistical data is received, the PC 30 displays the statistical data on a pop-up window at step 307. If it is determined at step 309 that an end request signal is received, the PC 30 terminates the procedure.

The operation of the GRF block 20 for outputting the trunk status information is shown in FIG. 6. If it is determined that an ASS number and PP number are received from the PC 30 at step 601, the GRF block 20 sends to the TDMH block 40 a trunk status information request signal at step 603. The GRF block 20 receives the current trunk status information from the TDMH block 40 in board units at step 605. The GRF block 20 sends the trunk status information to the PC 30 in board units at step 607. At step 609, the GRF block 20 updates the on-line trunk status information received in card units. If it is determined at step 611 that a corresponding card window of the PC 30 is opened, the GRF block 20 sends the on-line trunk status information to the PC 30 at step 613. Thus, the GRF block 20 sends to the PC 30 the initial trunk status information and on-line trunk status information so that they can be displayed on the window of PC 30. If it is determined at step 611 that the card window is not opened, a return to step 609 is executed.

A control procedure executed by the GRF block 20 for outputting trunk busy information is shown in FIG. 7. If it is determined at step 701 that a specific ASS number and PP number are received from the PC 30, the GRF block 20 sends a trunk busy information request signal to the TKC block 50 at step 703. The GRF block 20 receives the busy information of a corresponding trunk from the TKC block 50 at step 705, and sends the received busy information to the PC 30 at step 707. The GRF block 20 updates on-line trunk busy information received from the TKC block 50 in card units at step 709. If it is determined at step 711 that a corresponding card window of the PC 30 is opened, the GRF block 20 sends the on-line trunk busy information to the PC 30 at step 713. Thus, the GRF block 20 sends the trunk busy information generated in real time to the PC 30 so as to be displayed on the window thereof. If it is determined at step 711 that the card window is not opened, a return to step 709 is executed.

A trunk status outputting process is expressed as signal flows between the respective blocks in FIG. 8.

Upon activation, the GRF block 20 receives the trunk installation information from the TRM block 10 at step 831. If the main window of the PC 30 is opened, the PC 30 sends to the GRF block 20 the trunk installation information request signal at step 801. The GRF block 20 then sends the trunk installation information to the PC 30 at step 803. If the board window 430 (FIG. 4) of the PC 30 is requested to be opened, the PC 30 sends to the GRF block 20 the specific ASS number and PP number at step 805. The GRF block 20 performs an operation for receiving the trunk status information from the TDMH block 40 at step 841, and sends the trunk status information to the PC 30 at step 807.

The GRF block 20 performs an operation for receiving the busy information from the TKC block 50 at step 851, and sends the trunk busy information to the PC 30 at step 809.

Upon reception of the on-line trunk information (on-line trunk status information and on-line trunk busy information) request signal at step 811, the GRF block 20 sends the on-line trunk information to the PC 30 at step 813. In this case, a corresponding window of the PC 30 should be opened. Upon reception of the statistical data request signal from the PC 30, the GRF block 20 sends the statistical data to the PC 30 at step 813.

Upon reception of the board window close signal from the PC 30 at step 815, the GRF block 20 sends an information transmission stop request signal to a corresponding subsystem at step 861. The PC 30 sends the main window close signal to the GRF block 20 at step 817.

In the present invention, the following techniques are used to graphically output the status of the trunk.

First, the inventive method for graphically outputting the status of the trunk is added to a conventional method for outputting the status of the trunk by inputting commands. If the operator selects the trunk status graphics mode, the trunk installation information is displayed on the window. The operator can be aware of the status of a desired trunk and the number of the installed trunks. Statistics for the status information of the trunk per link are also output.

Second, if the operator selects a PP of a subsystem, the current trunk information is received from the speech path block and the following trunk information is updated. The trunk busy information is sent to the call processing related block to update it in the library. Therefore, the operator can know the trunk information which is changed in real time, and there is no need to input trunk related commands.

Third, eight colors are graphically used so that the status of the trunk which is represented by about 30 forms can be easily understood. Namely, in displaying the state of the trunk, different colors are used according to trunk information statistics of a board and the status of the trunk. Moreover, trunk status information statistics for 4 or 5 links per board are displayed and trunk card information is displayed in board units. Information about each link is also displayed so that the user can know the trunk status information easily.

Fourth, busy information statistics of a corresponding board and trunk status change statistics per link are graphically displayed. Detailed statistical data for them can be displayed by a click. If the window for outputting the statistical data is opened, information which is changed on line is updated to give an operator an easy understanding.

In order to prevent overload of the switching system due to on-line transmission, only the PP information of the selected ASS is received, and thus a maximum of 2K information is processed.

As described above, the status of the trunk is graphically output, transmitted on line, and represented by different colors to discriminate it from the trunk information statistics of the board, thereby providing for easy understanding. Moreover, since only the PP information of the selected ASS (a maximum of 2K information) is processed on line, overloading of the switching system can be minimized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for graphically outputting a status of a trunk in a switching system which includes a personal computer (PC) providing windows to display the status of the trunk, a graphics data management block for driving trunk related processors, for receiving trunk installation information, trunk status information and trunk busy information from corresponding blocks, and for providing the PC with the received information and trunk status information statistical data, a traffic resource management block for sending the trunk installation information to the graphics data management block, a status management block for sending the trunk status information to the graphics data management block, and a trunk control block for sending the trunk busy information to the graphics data management block, said method comprising the steps of:

receiving the trunk installation information from the graphics data management block in response to selection of a trunk status graphics mode, and displaying the received trunk installation information on a main window;

if a specific trunk is selected among the displayed trunk installation information, receiving the trunk status information and trunk busy information for the selected trunk from the graphics data management block, and displaying the received trunk status information and trunk busy information on a corresponding subwindow;

if there are trunk status information and trunk busy information generated on line for the selected trunk, automatically receiving the on-line generated trunk status information and trunk busy information from the graphics data management block, and updating and displaying the on-line generated trunk status information and trunk busy information on the corresponding subwindow; and receiving the trunk status information statistical data from the graphics data management block in response to a statistical data request signal, and displaying the received trunk status information statistical data on a corresponding window.

2. The method as claimed in claim 1, further comprising the step of deleting the displayed trunk status information and trunk busy information after displaying the trunk status information and trunk busy information.

3. The method as claimed in claim 2, further comprising the steps of:

if another specific trunk is selected, receiving the trunk status information and trunk busy information of the selected trunk from the graphics data management block, and displaying the received trunk status information and trunk busy information on the corresponding subwindow; and if there are trunk status information and trunk busy information generated on line from the selected trunk, automatically receiving the on-line generated trunk status information and trunk busy information from the graphics data management block, and updating and displaying the on-line generated trunk status information and trunk busy information on the corresponding subwindow.

4. A method for graphically outputting a status of a trunk in a switching system which includes a personal computer (PC) for displaying the status of the trunk, a graphics data management block for driving trunk related processors and for receiving trunk installation information, trunk status information and trunk busy information from corresponding blocks, a traffic resource management block for sending the trunk installation information to the graphics data management block, a status management block for sending the trunk status information to the graphics data management block, and a trunk control block for sending the trunk busy information to the graphics data management block, said method comprising the steps of:

receiving the trunk installation information from the traffic resource management block in response to activation of the graphics data management block and storing the received trunk installation information;

if a main window of the PC is opened, sending a trunk installation information request signal to the graphics data management block;

displaying trunk installation information received from the graphics data management block on a graphics screen;

if a board window of the PC is opened, sending a number of a specific trunk selected by an operator to the graphics data management block;

receiving trunk status information corresponding to the number of the specific trunk from the status management block, receiving the trunk busy information from the trunk control block, and sending the received trunk status information and trunk busy information to the PC according to a PC format;

displaying the received trunk status information and trunk busy information on the graphics screen; and if trunk status information and trunk busy information generated on line are sent from the status management block and the trunk control block, respectively, to the graphics data management block, sending the on-line generated trunk status information and trunk busy information to the PC, and updating and displaying the on-line generated trunk status information and trunk busy information on a corresponding graphics screen.

5. The method as claimed in claim 4, wherein the graphics screen outputs the trunk status information and the trunk busy information in different colors.

6. The method as claimed in claim 4, further comprising the steps of deleting all information output on the graphics screen if a new board window of the PC is opened, receiving the trunk status information and the trunk busy information of a newly selected trunk from the graphics data management block, and displaying the received trunk status information and trunk busy information on the graphics screen.

7. The method as claimed in claim 6, further comprising the steps of sending the trunk status information and trunk busy information received from the graphics data management block to the PC, and updating and displaying the on-line generated trunk status information and trunk busy information on a corresponding graphics screen.

8. An apparatus for graphically outputting a status of a trunk in a switching system, comprising:
   traffic and resource management (TRM) means responsive to a first request signal for providing trunk installation information;
   telephony device maintenance and handling (TDMH) means responsive to a second request signal for providing at least one of initial trunk status information and on-line trunk status information;
   trunk control (TKC) means responsive to a third request signal for providing trunk busy information;
   graphics data retrieving and forwarding (GRF) means for generating said first, second and third request signals, and for receiving said trunk installation information from said TRM means, said at least one of said initial trunk status information and said on-line trunk status information from said TDMH means, and said trunk busy information from said TKC means; and
   personal computer (PC) means for transmitting an information request signal to said GRF means, said GRF means being responsive to said information request signal for generating at least one of said first, second and third request signals, and for receiving and forwarding, to said PC means, requested information corresponding to said information request signal, said PC means receiving said requested information in at least one display window of said PC means.

9. The apparatus of claim 8, wherein said PC means receives the trunk installation information from the GRF means in response to selection of a trunk status graphics mode, and display the received trunk installation information on a main window of said PC means.

10. The apparatus of claim 8, wherein said PC means selects a specific trunk and sends a corresponding information request signal to said GRF means, said PC means receiving the trunk status information and the trunk busy information for the selected trunk from the GRF means, and displaying the received trunk status information and trunk busy information on a corresponding subwindow of said PC means.

11. The apparatus of claim 10, said PC means deleting the displayed trunk status information and trunk busy information after displaying the trunk status information and trunk busy information.

12. The apparatus of claim 10, wherein:
   if another specific trunk is selected, said PC means receives the trunk status information and the trunk busy information of the selected trunk from the GRF means, and displays the received trunk status information and trunk busy information on the corresponding subwindow of said PC means; and
   if there are trunk status information and trunk busy information generated on line from the selected trunk, said PC means automatically receives the on-line generated trunk status information and trunk busy information from the GRF means, and updates and displays the on-line generated trunk status information and trunk busy information on the corresponding subwindow of said PC means.

13. The apparatus of claim 10, wherein, if there are trunk status information and trunk busy information generated on line for the selected trunk, said PC means automatically receives the on-line generated trunk status information and trunk busy information from the GRF means, and updates and display the on-line generated trunk status information and trunk busy information on the corresponding subwindow of said PC means.

14. The apparatus of claim 8, wherein said PC means transmits a statistical data request signal to said GRF means, receives the trunk status information statistical data from the GRF means in response to the statistical data request signal, and displays the received trunk status information statistical data on a corresponding window of said PC means.

15. The apparatus of claim 8, wherein said GRF means receives the trunk installation information from the TRM means in response to activation of the GRF means, and stores the received trunk installation information.

16. The apparatus of claim 15, wherein:
   if a main window of the PC means is opened, said PC means sends a trunk installation information request signal to the GRF means, and displays the trunk installation information received from the GRF means on a graphics screen of the PC means.

17. The apparatus of claim 8, wherein:
   if a board window of the PC means is opened, said PC means sends a number of a specific trunk selected by an operator to the GRF means, said GRF means receives trunk status information corresponding to the number of the specific trunk from the TDMH means, receives the trunk busy information from the TKC means, and sends the received trunk status information and trunk busy information to the PC means.

18. The apparatus of claim 17, wherein said PC means displays the received trunk status information and trunk busy information on a graphics screen of the PC means.

19. The apparatus of claim 8, wherein:
   if trunk status information and trunk busy information generated on line are sent from the TDMH means and the TKC means, respectively, to the GRF means, said GRF means sends the on-line generated trunk status information and trunk busy information to the PC means, and said PC means updates and displays the on-line generated trunk status information and trunk busy information on a corresponding graphics screen of said PC means.

20. The apparatus of claim 19, wherein the graphics screen outputs the trunk status information and the trunk busy information in different colors.

21. The apparatus of claim 8, wherein said PC means deletes all information output on the graphics screen if a new board window of the PC means is opened, receives the trunk status information and the trunk busy information of a newly selected trunk from the GRF means, and displays the received trunk status information and trunk busy information on the graphics screen.

* * * * *